(12) United States Patent
Schleimer et al.

(10) Patent No.: US 9,171,044 B2
(45) Date of Patent: Oct. 27, 2015

(54) METHOD AND SYSTEM FOR PARALLELIZING DATABASE REQUESTS

(75) Inventors: Stephen Schleimer, Campbell, CA (US); Ryder B. Rishel, Mountain View, CA (US); Derek A. Taylor, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 687 days.

(21) Appl. No.: 12/832,044

(22) Filed: Jul. 7, 2010

(65) Prior Publication Data

US 2011/0202929 A1    Aug. 18, 2011

Related U.S. Application Data

(60) Provisional application No. 61/304,866, filed on Feb. 16, 2010.

(51) Int. Cl.
*G06F 7/00*     (2006.01)
*G06F 3/00*     (2006.01)
*H04N 21/432*   (2011.01)
*G06F 17/30*    (2006.01)

(52) U.S. Cl.
CPC ............................... *G06F 17/30474* (2013.01)

(58) Field of Classification Search
CPC ............ G06F 7/00; G06F 3/00; H04N 21/432
USPC .......................................................... 718/432
See application file for complete search history.

(56) References Cited

U.S. PATENT DOCUMENTS

| 3,964,029 | A |   | 6/1976  | Babb            |         |
|-----------|---|---|---------|-----------------|---------|
| 4,118,788 | A |   | 10/1978 | Roberts         |         |
| 4,255,796 | A |   | 3/1981  | Gabbe et al.    |         |
| 4,525,780 | A | * | 6/1985  | Bratt et al.    | 711/163 |
| 4,606,002 | A |   | 8/1986  | Waisman et al.  |         |
| 4,633,387 | A |   | 12/1986 | Hartung et al.  |         |
| 4,677,550 | A |   | 6/1987  | Ferguson        |         |
| 4,774,657 | A |   | 9/1988  | Anderson et al. |         |
| 4,811,199 | A |   | 3/1989  | Kuechler et al. |         |

(Continued)

FOREIGN PATENT DOCUMENTS

WO          WO 92/06440            4/1992

OTHER PUBLICATIONS

Ramanathan et al. (Ramanathan), "Deriving Service Principles Relating Lean in-the-large Systems to Autonomous in-the-small Entities", OSU-CISRC-5/07-TR37, The Ohio State University, Columbus Ohio 43210, Feb. 8, 2007, Revised May 22, 2007.*

(Continued)

*Primary Examiner* — Thomas L Mansfield, Jr.
(74) *Attorney, Agent, or Firm* — Hickman Palermo Becker Bingham LLP

(57) ABSTRACT

Methods and systems are described for applying the use of shards within a single memory address space. A database request is processed by providing the request from a client to a processor, the processor then distributing the request to multiple threads within a single process but executing in a shared memory address environment, wherein each thread performs the request on a distinct shard, and aggregating the results of the multiple threads being aggregated and returning a final result to the client. By parallelizing operations in this way, the request response time can be reduced and the total amount of communication overhead can be reduced.

20 Claims, 6 Drawing Sheets

(56) References Cited

U.S. PATENT DOCUMENTS

| | | | |
|---|---|---|---|
| 4,811,217 A | 3/1989 | Tokizane et al. |
| 4,817,036 A | 3/1989 | Millett et al. |
| 4,827,462 A | 5/1989 | Flannagan et al. |
| 4,829,427 A | 5/1989 | Green |
| 4,853,843 A | 8/1989 | Ecklund |
| 4,945,475 A | 7/1990 | Bruffey et al. |
| 4,947,320 A | 8/1990 | Crus et al. |
| 4,956,774 A | 9/1990 | Shibamiya et al. |
| 4,980,822 A | 12/1990 | Brantley et al. |
| 5,043,872 A | 8/1991 | Cheng et al. |
| 5,222,235 A | 6/1993 | Hintz et al. |
| 5,237,678 A | 8/1993 | Kuechler et al. |
| 5,241,648 A | 8/1993 | Cheng et al. |
| 5,247,672 A | 9/1993 | Mohan |
| 5,255,387 A | 10/1993 | Arnold et al. |
| 5,257,365 A | 10/1993 | Powers et al. |
| 5,265,245 A | 11/1993 | Nordstrom et al. |
| 5,307,485 A | 4/1994 | Bordonaro |
| 5,325,525 A | 6/1994 | Shan et al. |
| 5,355,477 A | 10/1994 | Strickland et al. |
| 5,398,199 A | 3/1995 | Lefons |
| 5,485,607 A | 1/1996 | Lomet et al. |
| 5,491,819 A | 2/1996 | Fatzinger et al. |
| 5,497,486 A | 3/1996 | Stolfo et al. |
| 5,499,367 A | 3/1996 | Bamford et al. |
| 5,546,570 A | 8/1996 | McPherson, Jr. et al. |
| 5,546,579 A | 8/1996 | Josten et al. |
| 5,557,792 A | 9/1996 | Josten et al. |
| 5,590,326 A | 12/1996 | Manabe |
| 5,592,671 A | 1/1997 | Hirayama et al. |
| 5,603,026 A | 2/1997 | Demers et al. |
| 5,615,361 A | 3/1997 | Leung et al. |
| 5,664,172 A | 9/1997 | Antoshenkov |
| 5,675,791 A | 10/1997 | Bhide et al. |
| 5,692,182 A | 11/1997 | Desai et al. |
| 5,724,573 A | 3/1998 | Agrawal et al. |
| 5,758,145 A | 5/1998 | Bhargava et al. |
| 5,761,653 A | 6/1998 | Schiefer et al. |
| 5,794,229 A | 8/1998 | French et al. |
| 5,813,005 A | 9/1998 | Tsuchida et al. |
| 5,848,408 A | 12/1998 | Jakobsson et al. |
| 5,864,842 A | 1/1999 | Pederson et al. |
| 5,870,735 A | 2/1999 | Agrawal et al. |
| 5,870,743 A | 2/1999 | Cohen et al. |
| 5,892,945 A | 4/1999 | Mirchandaney et al. |
| 5,956,704 A | 9/1999 | Gautam et al. |
| 5,970,495 A | 10/1999 | Baru et al. |
| 6,003,036 A | 12/1999 | Martin |
| 6,014,656 A | 1/2000 | Hallmark et al. |
| 6,023,702 A | 2/2000 | Leisten et al. |
| 6,069,705 A | 5/2000 | Suvarna |
| 6,092,062 A | 7/2000 | Lohman et al. |
| 6,112,198 A | 8/2000 | Lohman et al. |
| 6,112,225 A | 8/2000 | Kraft et al. |
| 6,223,182 B1 | 4/2001 | Agarwal et al. |
| 6,240,428 B1 | 5/2001 | Yeung et al. |
| 6,263,331 B1 | 7/2001 | Liu et al. |
| 6,345,267 B1 | 2/2002 | Lohman et al. |
| 6,438,562 B1 | 8/2002 | Gupta et al. |
| 6,505,227 B1 | 1/2003 | Mirchandaney et al. |
| 6,549,931 B1 | 4/2003 | Amor et al. |
| 2004/0205054 A1* | 10/2004 | Evans et al. ................ 707/3 |
| 2008/0008202 A1* | 1/2008 | Terrell et al. .............. 370/401 |
| 2008/0177994 A1* | 7/2008 | Mayer ........................ 713/2 |
| 2009/0254774 A1* | 10/2009 | Chamdani et al. .......... 714/2 |
| 2009/0304003 A1* | 12/2009 | Huynh Van et al. ..... 370/395.31 |
| 2010/0042607 A1 | 2/2010 | Min et al. |

OTHER PUBLICATIONS

J. Cheng, et al. "An Efficient Hybrid Join Algorithm: A DB2 Prototype", Proceedings of the 7$^{th}$ International Conference on Data Engineering dated Apr. 1991.

Lee et al., "A Multi-granularity Locking Model for Con-currency Control in Object-Oriented Database System", IEEE Transactions on Knowledge and Data Engineering, vol. 8, No. 1 Feb. 1996.

Haldar et al. "A Dynamic Granularity Locking Protocol for Tree-Structured Databases", IEEE Databases, 1991.

Douglas Comer, "The Ubiquitos B-Tree", Computing Surveys, vol. 11, No. 2 Jun. 1979, pp. 121-137.

Dandamudi et al., "Locking Granularity in Multiprocessor Database Systems", IEEE Database, 1991.

David J. DeWitt, Shahram Ghandeharizadeh, Donovan A. Schneider, Alllan Bricker, Hui-I Hsiao, Rick Rasmussen, The Gamma Database Machine Project, IEEE Transactions on Knowledge and Data Engineering, vol. 2, Mar. 1, 1990, pp. 44-62.

Alon Y. Levy, Inderpal Singh Mumick, Yehoshua Sagiv, Query Optimization by Predicate Move—Around Proceeding of the 20$^{th}$ VLDB Confernece, Santiago, Chile, 1994, pp. 96-107.

Fortier et al., "Simulation Analysis of early Commit Concurrency Control Protocols", IEEE Database, 1995.

Adve et al., "A Comparison of Entry Consistency and Lazy Release Consistency Implementations", IEEE Database 1996.

Prasad et al., "Using Parallel Data Structures in Optimistic Discrete Event Simulation of Varying Granularity on Shared—Memory Computers", IEEE Database, 1995.

Jeff Winchell, "Dbase IV 2.0 Query Innovations: Borland's Latest Dbase Release: On the Forefront of Bitmap Index Optimization", DBMS, vol. 6, No. 10, Oct. 1993 pp. 68-71.

Donald E. Knuth The Art of Computer Programming, vol. 3/Sorting and Searching, Addison Wesley Publishing Company, USA 1973, pp. 550-567.

Ashany, Ron Application of Sparse Matrix Techniques to Search, Retrieval, Classification, and Relationship Analysis in Large Data Base Systems—SARCOM, Fourth International Conference on Very Large Data Bases, West Berlin, Germany, Sep. 13-15, 1978, p. 4999.

Jeff Wincell, "Foxpro 2.0's Rushmore: Here's How FoxPro 2.0's New Technology Speeds Queries", DBMS, vol. 4, No. 10, Sep. 1991, pp. 54-59.

Rushmore's Bald Spot, DBMS, vol. 4, No. 10, Sep. 1991.

* cited by examiner

METHOD AND SYSTEM FOR PARALLELIZING DATABASE REQUESTS

RELATED APPLICATION

This application claims priority of U.S. Application Ser. No. 61/304,866 of the present inventors filed Feb. 16, 2010, entitled Micro-shard database architecture, incorporated herein by reference.

BACKGROUND

The present invention relates to means and methods for reducing the time that is required to search a database, insert records into a database, update records in a database, or delete records from a database.

The ability within a database to quickly insert, update, select, or delete individual records that match a particular criterion is of substantial commercial value. Some database systems offer enhanced speed at the cost of sacrificing the ACID (atomicity, consistency, isolation, durability) properties of the database system. The ability to offer high performance while still maintaining the integrity of these properties is greatly desired.

One way to improve the response time of a request to a database is to partition the database table into smaller components ("partitions") by distributing the records, or rows, to different database processes. Each partition is located in a separate process, or a distinct virtual address space managed by the host operating system. The partitions may be on either separate database servers or the same database server. Each individual partition is referred to as a database "shard." An advantage of this approach is that the number of rows in each table is reduced. The use of shards ("sharding") reduces the index size, reduces contention on database resources, and allows for improved performance. Depending on the method used to partition the database it may be possible to execute a request on a limited subset of the shards when it is known that the limited subset would contain all of the request responses.

However, sharding suffers a penalty in that data must be explicitly communicated between shards when operations occur that require communication between shards such as a join, ordering with a limit, or some other aggregation.

While sharding may reduce database response time, there is additional overhead in maintaining a distributed partition map for the database shards and creating the communication structures that are necessary to distribute the requests and consolidate responses. In common practice, much of this overhead is managed outside the database in the application layer of software, since the database is itself sharded and has no central repository to manage this state. This additional complexity makes sharding less usable and therefore less desirable to application developers.

When a database is sharded, the communication overhead can be a significant cost. Before intermediate results from each shard can be reduced to a final result set, the intermediates must be communicated to a central process that aggregates the intermediates and produces the final result set. Often during the aggregation process many of the intermediates are discarded. Those intermediate results which do not actually qualify as part of the final result set use up valuable bandwidth in communication channels which can be quite expensive.

It is therefore desirable to improve the response time and decrease the maintenance overhead associated with database requests.

BRIEF SUMMARY

The present invention is defined by the following claims, and nothing in this section should be taken as a limitation on those claims. Methods and systems are described for applying the use of shards within a single process, or in other words, within a single virtual address space. In one aspect, a database request is processed by providing the request from a client to a processor, the processor then distributing the request to multiple threads within a single process, wherein each thread performs the request on a distinct shard, and aggregating the results of the multiple threads and returning a final result to the client. By parallelizing operations in this way, the response time and communication overhead is reduced.

Within the database industry, shards are typically presumed to be distributed on separate database processes, possibly in separate physical locations. To distinguish such distributed shards from the shards within a common memory space and directly accessible by the cores or processors of a single server, the latter will be referred to as "micro-shards." The creation, maintenance, and use of micro-shards will be referred to as "micro-sharding."

One goal of a micro-sharding architecture is to provide higher central processing unit (CPU) utilization for database operations by reducing contention between database components that limit the ability to exploit multiple processors for parallel operations.

Another goal of the present micro-sharding architecture is to provide for efficient transfer of intermediate results to an aggregating thread to provide maximum reduction in the bandwidth required to send a result set to a client.

Micro-sharding implements a database engine as a collection of non-overlapping or shared-nothing database engine components. These components live within a common processing space, receive work through a single shared front end that is connected to multiple clients, and coordinate work on aggregate requests through explicit communication queues.

Micro-sharding requires both distribution and gathering operations to satisfy request results. These distribution and gathering operations are implemented through coordinated means not visible to a database user. As a consequence, the database appears monolithic to users, but the internal structure is micro-sharded. This avoids the problems associated with sharding that require application developers to manage partition tables in the application and permits effective multi-process performance.

Micro-sharding works well when the common front end manages a partition table that allows individual requests to be mapped to specific micro-shards. However, partitioning itself is not required for micro-sharding to be beneficial. Specifically, data can be inserted into any micro-shard without regard to a partitioning scheme. Finding data in the face of such a "non-partitioned" scheme requires that all micro-shards be examined for data in concert. For some workloads this is acceptable.

BRIEF DESCRIPTION OF THE DRAWINGS

The present invention may be further understood from the following description in conjunction with the appended drawings. In the drawings:

FIG. 1A, FIG. 1B, and FIG. 1C will be referred to as FIG. 1 below, when reference is to the composite.

FIG. 6A and FIG. 6B will be referred to as FIG. 6 below, when reference is to the composite.

DETAILED DESCRIPTION

Described herein are methods and systems for generating results of a database request using multiple, parallel processors, by transforming the request into a series of sub-requests, each of which is performed using a different thread on a processor but in the same memory address space, and applying those sub-requests to subsets of the database (micro-shards). Also described herein are techniques for managing the shards and aggregating the processing results.
Definitions The following definitions are useful. They are given with regard to their usage in a database context.

A shard is an autonomous slice of data over which operations may be performed without consideration for any other possible data in the database.

A micro-shard is a shard that shares an address space with other shards but is otherwise wholly independent of other shards. Database components, such as tables, rows, indexes, and resource management state machines, and database operations, such as locking, copying, and allocation of memory space are all distinct from one micro-shard to another.

A request refers to any of four database operations: an insert, a delete, an update, or a select. "Query" is sometimes used as a synonym for "request," or, depending on context, "query" may refer specifically to a "select."

In a micro-sharded database, a sub-request is a request applied to a micro-shard. It generates an intermediate result that must be aggregated prior to generation of a final result.
Database Parallelization FIG. 1 shows three approaches to parallelizing database requests.

Figure 1A:
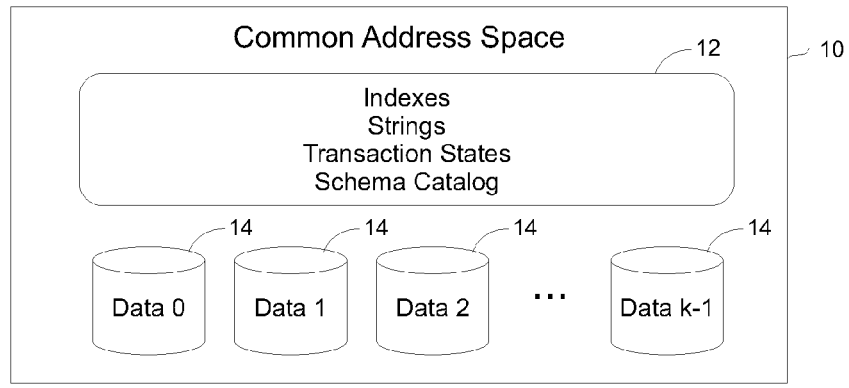
FIG. 1A shows a traditional threading environment.

FIG. 1A shows parallelization using traditional threading, as is known in the art. In traditional threading, multiple processing threads utilize a common address space (10), which contains a common area (12) that contains indexes, strings, transaction states, and a schema catalog for all of the processing threads. Individual processing threads apply their requests, however, to k distinct subsets of the data (14). This approach may improve overall CPU utilization and the speed at which a request can be completed. However, the benefits of this approach are limited due to lock contention between threads.

Figure 1B:
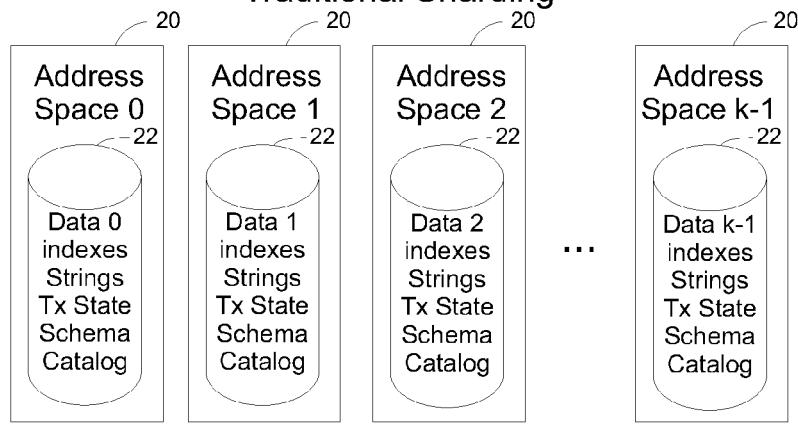
FIG. 1B shows a traditional sharding environment.

FIG. 1B shows parallelization using traditional (explicit) shards, as is known in the art. With traditional shards, the database data and the associated management data (including indexes, strings, transaction state and schema catalog) are distributed across some number of address spaces (20), shown as in FIG. 1B as k address spaces. Within each address space is a subset of the database data (shown as data 0 through data k−1), as well as the associated indexes, strings, transaction states and schema catalog (22). This approach may also significantly improve the search time associated with each shard, but combining the sub-results from each of the sub-requests typically entails transmitting sub-results over a network. Many of these sub-results may be discarded during aggregation, resulting in wasted network bandwidth and ultimately a drop in performance.

Figure 1C:
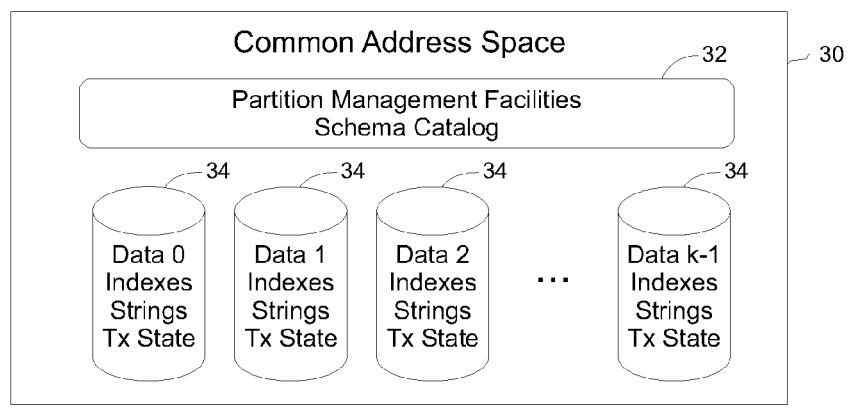
FIG. 1C shows a micro-sharding environment.

FIG. 1C shows micro-sharding, according to an embodiment of the present invention. Within a common address space (30) is a shared set of partition management facilities and a schema catalog (32). Also within the common address space are parallel silos of data, each containing a portion, or shard, (34) of the database data, as well as the associated indexes, strings, and transaction state information. As described hereafter, different processing threads apply requests to different micro-shards.
Micro-Shard Database Management There are several areas where the management of micro-sharded databases require special consideration, as described below.
Resource Recovery In a typical database, resource recovery can be done with each operation. For example, a "delete" may return the deleted data space to a pool of available space. More preferably, resource recovery is done out of line with the normal database operations. This permits normal operations to proceed at higher speed, not encumbered by resource management housekeeping.

In a micro-sharded database, resource recovery can be done in any of the common ways known to those experienced in the art. However, whichever mechanism is employed, it must operate within a micro-shard independently of any other micro-shard. This ensures that the "shared-nothing" property of sharding is preserved.
Global State In a typical database, global state is available for managing the components of the database. In a micro-sharded database, there is no global state. Communication among micro-shards, if any, is accomplished via explicit messages. A simple queue for communication is an example of one communication mechanism.

Micro-sharding differs from standard sharding in that the shared address space allows for very efficient communication. For example, there is no need to copy message bodies between shards. Instead, a large message can be transferred efficiently by only sending a small message header containing a single memory address and message size.
Aggregation of Asynchronous Message Streams In a typical database, for a given request, there is a single source of data—the common data store. There may be several threads that operate over the data creating streams of output for aggregation. In a micro-sharded database, each of the available threads operate over independent micro-shards. For requests that require work on more than a single micro-shard, aggregation is required. The required aggregation depends on the type of request, as discussed below, for each of these request types: insert, select, delete, and update.

In the case of an "insert," when an insert is of a single row, it may be inserted according to a primary key (if the table is partitioned on the primary key) or simply delivered to any available micro-shard (if the table is not partitioned on any key). If more than a single row is being inserted and the data is partitioned or other distributed constraints are being enforced, then the rows must be delivered to the appropriate micro-shard and the results of the insert gathered from each participating micro-shard for return to the client.

In the case of a "select," when the table is not partitioned, a select of that table must be delivered to all micro-shards in case that micro-shard has any information relevant to the request. If the table is partitioned, a select may be delivered to a single micro-shard when the request planner, in conjunction with the partition map, can deduce the micro-shard destination from the request. If not, the select will be delivered to all micro-shards. An aggregator must collect all generated rows from the request and deliver them to the client.

In the case of a "delete," as in the case of a select, if the planner can deduce the micro-shard containing the row(s) to be deleted, the request can be delivered to the appropriate micro-shard. Otherwise, the delete request is delivered to all micro-shards so that all appropriate rows in all micro-shards will be deleted. The aggregation process collects all result information and returns it to the client.

In the case of an "update," as in the case of a select, if the planner can deduce the micro-shard containing the row(s) to be updated, the request can be delivered to the appropriate micro-shard. Otherwise, the update request is delivered to all micro-shards so that all appropriate rows in the micro-shards will be updated. The aggregation thread collects all result information and returns it to the client.

Request Processing

Figure 2:
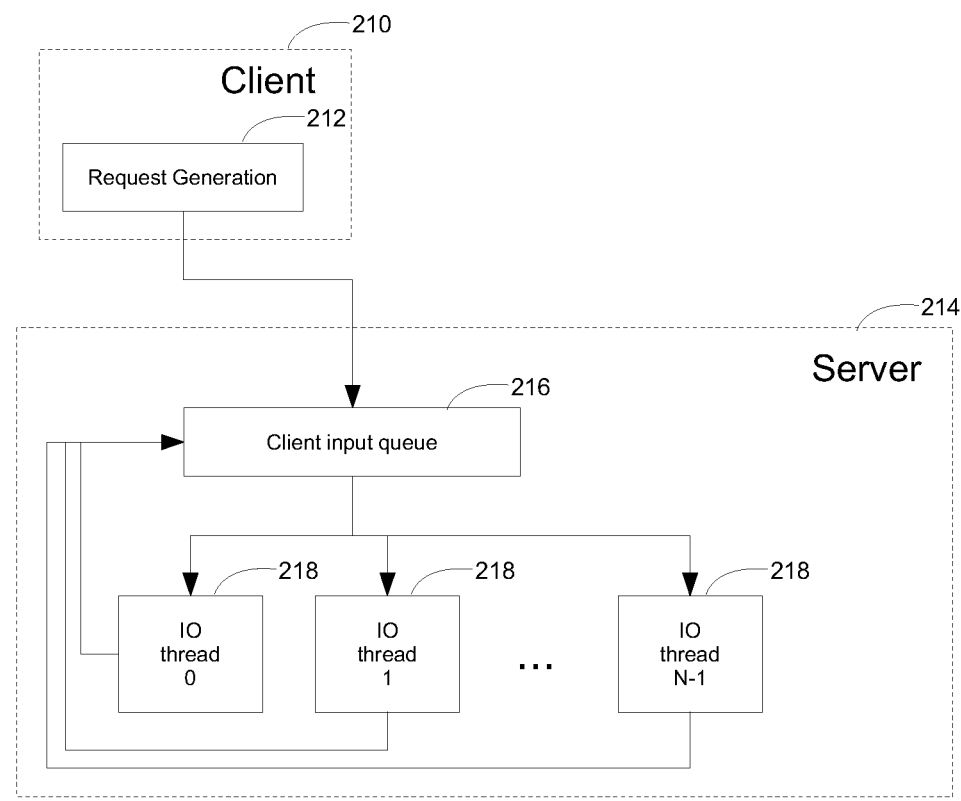
FIG. 2 shows the environment in which requests are processed.

FIG. 2 shows the environment in which requests are processed (200). A client (210) performs request generation (212) resulting in a request being passed to a client input queue (216) on a server (214). The request may be generated by a user on the client, or by some other process. Requests may be nested, so that the result of one request becomes a portion of the input or definition of another request. The client may be remote, such as connected through the internet with TCP/IP commands, or reside on the same computer or server as the database, although it is shown in the figure as a separate entity. The requests are placed in a client input queue (216). The processing and queuing within the client input queue (216) is further elucidated in FIG. 3.

Threads (218) wait for requests to appear in the input queue from the client, and then operate on those requests.

Figure 3:
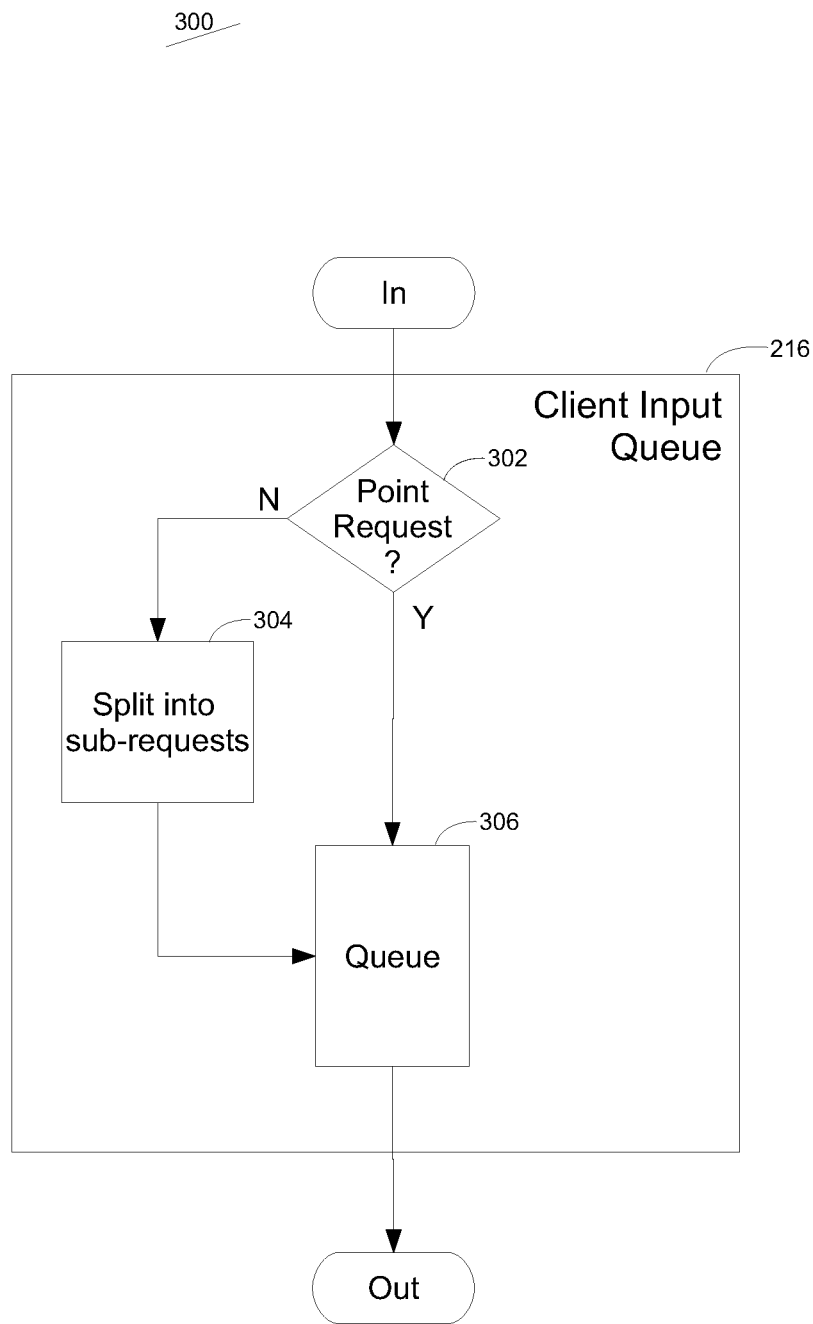
FIG. 3 shows the processing associated with the client input queue.

FIG. 3 illustrates the processing (300) associated with the client input queue (216). Upon receiving a request, if the request is determined (302) to be a point request, meaning it can be satisfied by accessing a single record in the database and the micro-shard that holds that record can be determined by the request, the request is placed in a queue (306) from which it is dispatched to the appropriate micro-shard. If the micro-shard is available to the thread then the thread executes the request on the micro-shard immediately. If the micro-shard is not available, the request is enqueued to the micro-shard and executed as soon as the micro-shard becomes available.

If the request is determined (302) to not be a point request, the request is processed by a thread in order to split, or divide, the request into sub-requests (304), each of which can execute on a separate, assigned micro-shard. The sub-requests are placed in a queue (306). A coordinating aggregation mutex may be used to ensure there is no deadlock with other aggregation requests currently in progress. Threads can receive individual point requests or sub-requests from the queue (306) for execution.

Note that multiple threads are able to draw from the queue. "N" threads are shown—the actual number may be dependent on the processing capabilities of the server. The requests obtained by the threads are either requests on individual micro-shards, or aggregation requests. By running simultaneously, or substantially simultaneously, faster processing of the entire client request is possible.

Upon receiving a database request, if the request is an aggregate sub-request, the thread obtains access to the assigned micro-shard and executes the sub-request. If the thread fails to obtain the micro-shard for direct execution, the sub-request is enqueued to the appropriate micro-shard so it will be executed as soon as the micro-shard becomes available.

Request Results Processing

Figure 4:
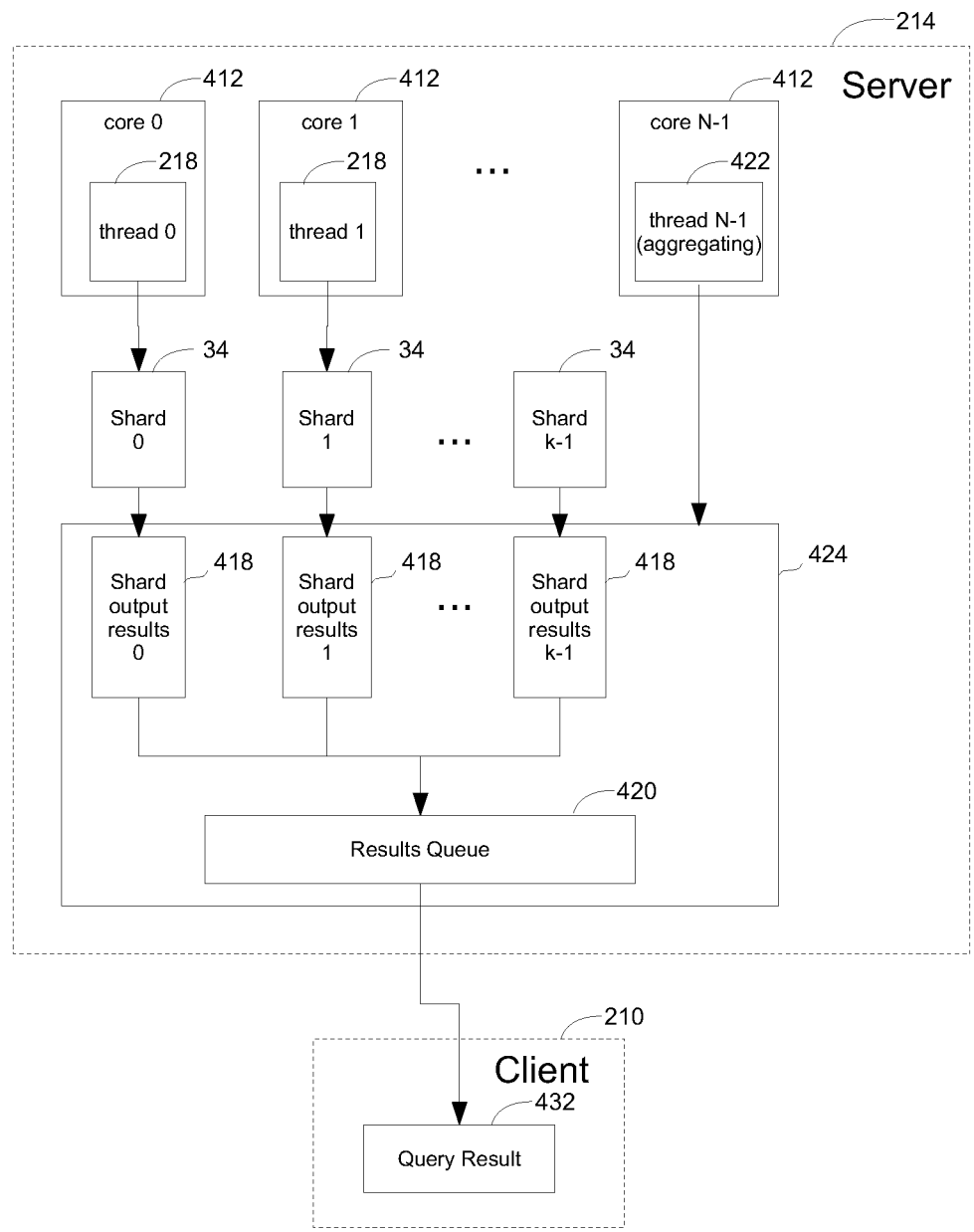
FIG. 4 shows the environment and processing for request results.

FIG. 4. shows the environment and processing (400) of request results. Within a server (214) are N cores, shown as core 0 through core N−1 (412). Many current servers contain 8 processors, each processor containing 2 cores, for a total of 16 cores. Other numbers of processors and cores per processor are certainly possible, and the number of cores per server is expected to increase.

A thread (218) runs within each core. More than one thread can run within a core, although this results in a time-multiplexing of processing between the multiple threads, in addition to thread management overhead, so there may be no advantage and even a disadvantage in this approach.

This approach also contemplates cores that use "Hyper-threads." Hyper-threaded processors have cores that have sufficient capability to effectively execute multiple threads of execution. As used herein, each available core or hyper-thread is considered a separate core that the micro-sharded database will employ in executing a database request. For example, if a system has four hyper-threaded cores each of which can support two "hyper-threads", the micro-sharded database will treat that as if there were eight cores available for executing database requests.

Threads execute sub-requests on the k shards (34), shown as shard 0 through shard k−1. As these shards are all within a common memory address space they are micro-shards as defined herein. Preferably, the micro-shards are stored in a semiconductor memory subsystem to enable rapid execution. In a server with N cores, one embodiment is to divide the database into k=N−1 micro-shards, leaving one core to process an aggregation thread (422). Other divisions are also possible. There may be the same number of micro-shards as cores. This provides for potentially more parallelism, but requires that the aggregation process be co-executed in a thread that also performs micro-shard result processing. There may also be more micro-shards than cores. This allows for more distribution on a partition attribute. It may not be the best implementation for aggregation operations since processors would need to be oversubscribed in order for all micro-shards to execute in parallel. However, the dispatching scheme may resolve this by assigning more than one micro-shard to a thread performing sub-request result processing. There is typically some number of micro-shards less than the number of cores, reserving the difference for cores available to compute aggregations.

When executing a request that requires an aggregation of the results of individual sub-requests, the result of the sub-request on each micro-shard (34) is stored in an associated micro-shard output queue (418). The aggregating thread (422) then combines (424) the outputs of the shard output queues (418), performs the desired aggregation and places the results in a results queue (420), and transmits the results to the client.

Aggregate Processing

Figure 5:
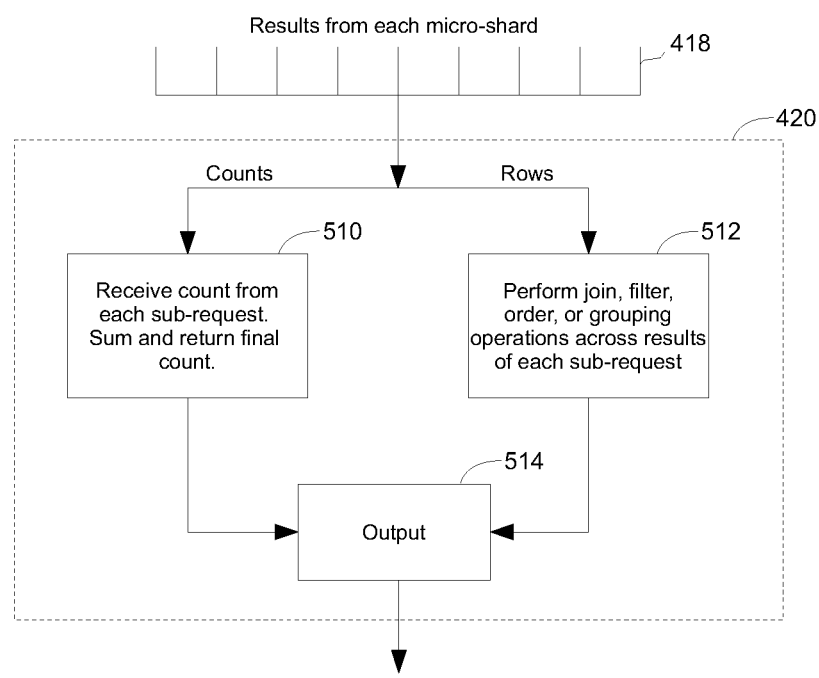
FIG. 5 shows an aggregation flow chart.

FIG. 5 illustrates the aggregation process (500) in more detail. The results from each micro-shard sub-request (418) are input into the aggregation queue (420). The aggregation may involve, for example, counting rows (510). The rows are counted by receiving the counts from each sub-request, summing them, and returning the summed, or final, count (510) to the output queue (514). The aggregation process may also involve row operations, such as joining, filtering, ordering, or grouping operations across the results of each sub-request (512), and placing the result of said row operations in the output queue (514). The aggregation may also incorporate grouping rows or statistics, computing statistics such as averages or standard deviations, or joining intermediate results from separate tables into a single result. The output queue (514) is used to decouple the aggregation thread from the I/O subsystem.

In general, a micro-shard does not require that only a single request or sub-request execute in isolation. In some implementations multiple requests may be dispatched to a micro-shard concurrently. This is particularly true for non-mutating requests, such as "select" requests.

The request received by the thread may be an aggregate request, such as a count accumulation aggregate request, or a row merge aggregate request.

Counts must be accumulated whenever an insert, update, or delete request is distributed. Generally, there are two cases for any count accumulation operation. In the first case, all but one of the threads returns 0 counts. This is the case when an insert, update, or delete applies to a single row. In this case, a single micro-shard will contain that row, and it is in this micro-shard where the update or delete takes place, and that micro-shard reports a count of 1; all other micro-shards report a count of 0. In a second case, most or all threads return non-zero counts. This is the case when an update or delete applies to more than one row, so possibly more than a single micro-shard will have rows to which the operation applies. When this is the case, each of the micro-shards that operated on these rows returns a non-zero result. In either case, the counts must be accumulated and returned to the client.

Similarly, returning rows must be merged into a single outbound stream to the client whenever a select request is distributed. If the request requires no ordering on the result set, then the aggregation thread simply forwards the rows to the client in whatever order it receives them from participating micro-shards. Typically, it queries them for more results in round robin sequence.

If the request specifies an ordering or grouping operation, then rows are first sorted based on the ordering criteria and returned in the correct order. The aggregate thread could employ any number of mechanisms in order to optimize this step. For example, if each returned sub-request result is itself ordered, then a simple priority queue can be used by the aggregating thread to provide the finally ordered output stream.

In the final aggregation step, request processing is stopped when a request specifies a limited result and that limit is reached.

In some cases, the row data itself is not returned to the client, but a set of computed values, possibly grouped and derived from the set of row data, is returned. In that case, the aggregate thread receives partial values sufficient to complete the computation required to provide the final value set for the client. This value set is then returned to the client.

Experimental Results

Standard practice is to use "sharding" as a way to get increased CPU utilization of computer servers. In standard sharding, multiple instances of a database will be invoked on the server up to the point where the available CPU resources are fully exploited. An alternative approach to use available CPU fully is to use multiple threads in a shared address space. However, CPU utilization using standard threading in a database is limited due to lock contention on the database resources. With micro-sharding, however, experiments have confirmed substantially linear scaling of CPU utilization in a threaded environment. The shared address space inherent in a threaded environment gives a micro-sharded database the opportunity to dramatically reduce network traffic because intermediate results which will not ultimately be included in the final result can be discarded before transmitting them over the network. In a fully sharded system, both needed and unneeded intermediate results must be transmitted over the network because the determination of whether an intermediate result is needed or unneeded is made by a separate entity.

Figure 6A:
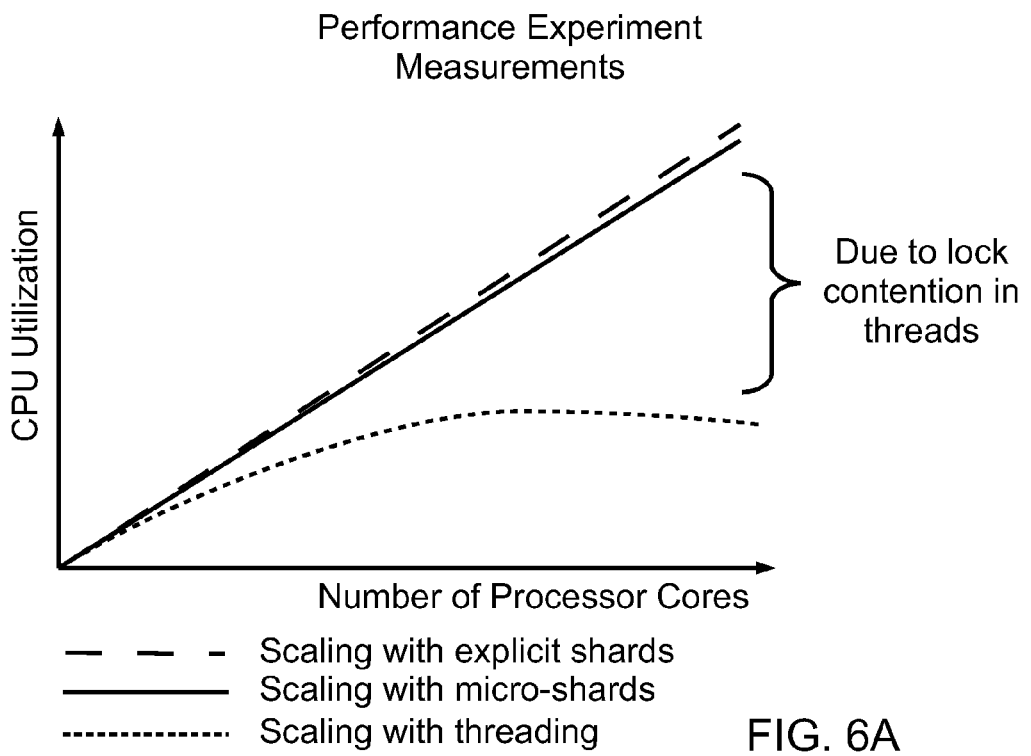
FIG. 6A shows experimental performance results of the increased CPU utilization associated with micro-sharding.

FIG. 6A illustrates the measured CPU performance utilization for implementations using traditional (explicit) shards, using micro-shards, and using threading. There may be a very slight decrease in CPU utilization using micro-shards compared with explicit shards, when using multiple processor cores However, there is a very significant benefit to using either explicit shards or micro-shards compared with threading, which can suffer from significant lock contention when multiple processor cores are operating on the database simultaneously.

Figure 6B:
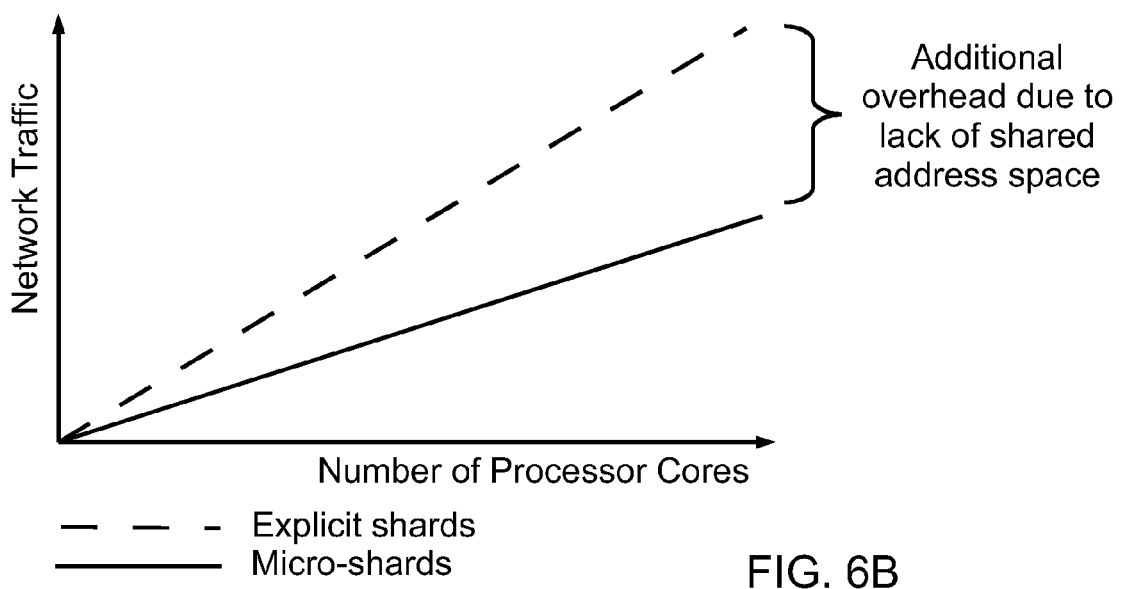
FIG. 6B shows experimental performance results of the decreased network traffic associated with micro-sharding.

FIG. 6B illustrates the measured network traffic when using explicit shards and when using micro-shards. The significant additional network traffic associated with using explicit shards results from the additional overhead required to transfer all of the sub-request results across a network to an aggregation thread, which may filter or otherwise reduce the amount of data returned as a result prior to transmitting it across a network. The use of micro-shards permits the aggregation process to execute quickly, without waiting for the return of sub-request results across a relatively slow network. Thus, the use of micro-shards allows a database to leverage the multiple processor cores within a server, without incurring the cost of the relatively slow network traffic that results in traditional sharding.

While the invention has been described above by reference to various embodiments, it will be understood that many changes and modifications can be made without departing from the scope of the invention. For example, the server may simply be a computer with a single core processor, although a plurality of cores would be preferable. The client may be a separate, remote computer, or may be integrated within the server. The micro-shards may be separated based on some criteria, such as partitioning, or there may be no such criteria.

It is therefore intended that the foregoing detailed description be understood as an illustration of the presently preferred embodiments of the invention, and not as a definition of the invention. It is only the following claims, including all equivalents that are intended to define the scope of the invention.

What is claimed is:

1. A method comprising:
    storing, by a plurality of threads of a common process running on a computing device, a plurality of separate data subsets in a common address space assigned to the common process in a semiconductor memory of the computing device;
    wherein the plurality of threads does not share access to the plurality of separate data subsets even though the plurality of separate data subsets are stored in the common address space;
    wherein communication between the plurality of threads of the common process is accomplished by storing messages in the common address space;
    receiving a database request;
    transforming the database request into a plurality of sub-requests;
    executing the plurality of sub-requests by the plurality of threads wherein execution of a particular sub-request of the plurality of sub-requests is performed on a particular separate data subset of the plurality of separate data subsets by a particular thread of the plurality of threads of the common process that stores the particular separate data subset;

producing a final result set by aggregating a plurality of intermediate result sets generated and stored in the common address space by the plurality of threads;

wherein the method is performed by the computing device.

2. The method of claim 1, wherein the common address space is a common virtual address space.

3. The method of claim 1, wherein a first sub-request of the plurality of sub-requests comprises an operation of the database request to be applied to a first data subset of the plurality of separate data subsets and a second sub-request of the plurality of the sub-requests comprises said operation to be applied to a second data subset of the plurality of separate data subsets.

4. The method of claim 1, wherein each data subset of the plurality of separate data subsets has a distinct index that is distinct from indexes of other data subsets of the plurality of separate data subsets and that is used to access said each data subset.

5. The method of claim 4, wherein each data subset of the plurality of separate data subsets further comprises distinct database transaction state information maintained independently from transaction state information of other data subsets of the plurality of separate data subsets.

6. The method of claim 1, wherein the database request is received from a client, the method further comprising returning the final result set to the client.

7. A non-transitory computer-readable medium storing one or more sequences of instructions which, when executed by a computing device comprising one or more processors, cause the one or more processors of the computing device to carry out:

storing, by a plurality of threads of a common process running on the computing device, a plurality of separate data subsets in a common address space assigned to the common process in a semiconductor memory;

wherein the plurality of threads does not share access to the plurality of separate data subsets even though the plurality of separate data subsets are stored in the common address space;

wherein communication between the plurality of threads of the common process is accomplished by storing messages in the common address space;

receiving a database request;

transforming the database request into a plurality of sub-requests;

executing the plurality of sub-requests by the plurality of threads wherein execution of a particular sub-request of the plurality of sub-requests is performed on a particular separate data subset of the plurality of separate data subsets by a particular thread of the plurality of threads of the common process that stores the particular separate data subset;

producing a final result set by aggregating a plurality of intermediate result sets generated and stored in the common address space by the plurality of threads.

8. The computer-readable medium of claim 7, wherein the common address space is a common virtual address space.

9. The computer-readable medium of claim 7, wherein a first sub-request of the plurality of sub-requests comprises an operation of the database request to be applied to a first data subset of the plurality of separate data subsets and a second sub-request of the plurality of the sub-requests comprises said operation to be applied to a second data subset of the plurality of separate data subsets.

10. The computer-readable medium of claim 7, wherein each data subset of the plurality of separate data subsets has a distinct index that is distinct from indexes of other data subsets of the plurality of separate data subsets and that is used to access said each data subset.

11. The computer-readable medium of claim 10, wherein each data subset of the plurality of separate data subsets further comprises distinct database transaction state information maintained independently from transaction state information of other data subsets of the plurality of separate data subsets.

12. The computer-readable medium of claim 7, wherein the database request is received from a client, wherein the one or more sequences of instructions include instructions which cause the one or more processors of the computing device to carry out returning the final result set to the client.

13. The method of claim 1, wherein the common address space further comprises a shared set of partition management facilities.

14. The method of claim 13, wherein the common address space further comprises a schema catalog.

15. The computer-readable medium of claim 7, wherein the common address space further comprises a shared set of partition management facilities.

16. The computer-readable medium of claim 15, wherein the common address space further comprises a schema catalog.

17. The method of claim 1, wherein each data subset of the plurality of separate data subsets has a distinct locking management component that is distinct from locking management components of other data subsets of the plurality of separate data subsets.

18. The computer-readable medium of claim 7, wherein each data subset of the plurality of separate data subsets has a distinct locking management component that is distinct from locking management components of other data subsets of the plurality of separate data subsets.

19. The method of claim 1,
wherein said communication is accomplished by storing the messages in one or more communication queues in the common address space,
the method further comprising writing, by the plurality of threads, the plurality of intermediate result sets in the one or more communication queues in the common address space.

20. The computer-readable medium of claim 7,
wherein said communication is accomplished by storing the messages in one or more communication queues in the common address space,
wherein the one or more sequences of instructions include instructions which cause the one or more processors of the computing device to carry out writing, by the plurality of threads, the plurality of intermediate result sets in the one or more communication queues in the common address space.

* * * * *

UNITED STATES PATENT AND TRADEMARK OFFICE
CERTIFICATE OF CORRECTION

PATENT NO. : 9,171,044 B2  Page 1 of 1
APPLICATION NO. : 12/832044
DATED : October 27, 2015
INVENTOR(S) : Schleimer et al.

It is certified that error appears in the above-identified patent and that said Letters Patent is hereby corrected as shown below:

Title Page, item (56)

On page 2, column 2, under other publications, line 9, delete "Ubiquitos" and insert -- Ubiquitous --, therefor.

On page 2, column 2, under other publications, line 19, delete "Confernece," and insert -- Conference, --, therefor.

In the Claims

In column 8, line 65, in claim 1, delete "threads" and insert -- threads, --, therefor.

In column 9, line 50, in claim 7, delete "threads" and insert -- threads, --, therefor.

Signed and Sealed this
Twenty-eighth Day of June, 2016

Michelle K. Lee
*Director of the United States Patent and Trademark Office*